United States Patent
Moran

(10) Patent No.: US 7,261,264 B2
(45) Date of Patent: *Aug. 28, 2007

(54) LOCKING ASSEMBLY

(75) Inventor: Eric M. Moran, Camano Island, WA (US)

(73) Assignee: Control Dynamics Inc., Everett, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/173,562

(22) Filed: Jul. 1, 2005

(65) Prior Publication Data

US 2007/0045492 A1 Mar. 1, 2007

Related U.S. Application Data

(63) Continuation-in-part of application No. 10/996,551, filed on Nov. 23, 2004, now Pat. No. 7,077,372.

(51) Int. Cl.
*A47B 96/00* (2006.01)

(52) U.S. Cl. .............................. 248/222.11; 248/224.51; 248/221.11; 248/222.13; 24/597; 24/573.11

(58) Field of Classification Search ........... 248/222.11, 248/224.51, 221.11, 222.13; 24/597, 573.11
See application file for complete search history.

(56) References Cited

U.S. PATENT DOCUMENTS

| | | | |
|---|---|---|---|
| 4,093,293 A | | 6/1978 | Huggett |
| 4,660,793 A | | 4/1987 | Mark |
| 4,720,611 A | * | 1/1988 | Ishii ........................ 200/61.61 |
| 4,789,128 A | | 12/1988 | Yang |
| 5,054,170 A | * | 10/1991 | Otrusina .................. 24/580.11 |
| 5,188,325 A | | 2/1993 | Hilty et al. |
| 5,201,858 A | * | 4/1993 | Otrusina .................. 24/573.11 |

(Continued)

OTHER PUBLICATIONS

Allen-Bradley, Bulletin 700-HK "Slim Line" Relay, Cat. No. 700-HN122.

(Continued)

*Primary Examiner*—Carl D. Friedman
*Assistant Examiner*—Todd M. Epps
(74) *Attorney, Agent, or Firm*—Graham & Dunn PC; Kathleen T. Petrich

(57) ABSTRACT

A locking assembly for readily attaching and detaching a device to a surface such as a wall, non-planar surface, or a plurality of bars such as those found in a kennel. The locking assembly has a bracket assembly with a front and back plate that are fixedly attached to each other about portions of peripheries of the front and back plates defining an opening therebetween with a top slot and at least one side slot. The back plate is directly or indirectly fixedly attached to a surface. Positioned within at least one side slot is at least one pivoting release lever having an upper leg and lower leg movable about a pivot. The locking assembly further includes a yoke assembly having a yoke assembly plate of a size and shape to fit edgewise and be guided into the opening between the front and bottom plates via the top slot. The upper leg of the pivoting release lever and an exterior surface of the yoke assembly plate can be mateably restrained through a pair of interlocking notches. A yoke extending from and fixedly attached to the yoke assembly plate is attached to the device.

33 Claims, 15 Drawing Sheets

U.S. PATENT DOCUMENTS

| | | | | |
|---|---|---|---|---|
| 5,347,693 | A | * | 9/1994 | Otrusina .................. 24/573.11 |
| 5,620,120 | A | * | 4/1997 | Tien ........................... 224/199 |
| 5,622,296 | A | * | 4/1997 | Pirhonen et al. ............ 224/197 |
| 5,850,996 | A | | 12/1998 | Liang |
| 6,059,156 | A | | 5/2000 | Lehtinen |
| 6,098,858 | A | | 8/2000 | Laugesen |
| 6,155,524 | A | | 12/2000 | Legler et al. |
| 6,189,489 | B1 | * | 2/2001 | Pearce ........................ 119/477 |
| 6,371,424 | B1 | * | 4/2002 | Shaw ..................... 248/222.12 |
| 7,077,372 | B2 | * | 7/2006 | Moran ................... 248/222.11 |
| 2005/0092801 | A1 | * | 5/2005 | Hicks et al. ................ 224/547 |

OTHER PUBLICATIONS

Lion Country Supply, Nelson Model 1400 Dog Feeding Pan, 2004, Website: lcsupply.com.

* cited by examiner

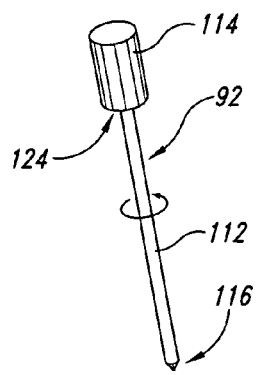
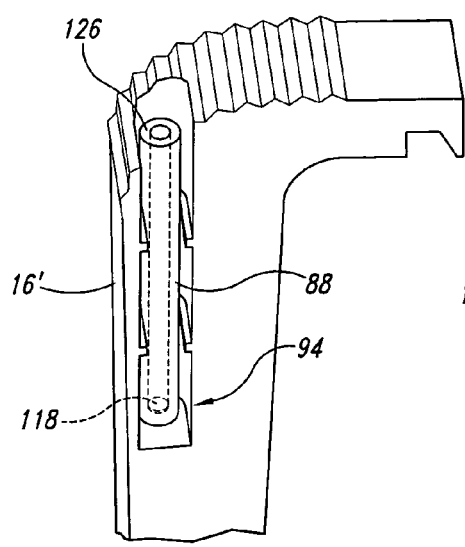
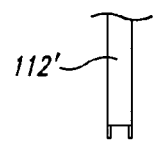
Fig. 15
Fig. 14
Fig. 17
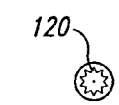
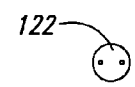
Fig. 16
Fig. 18
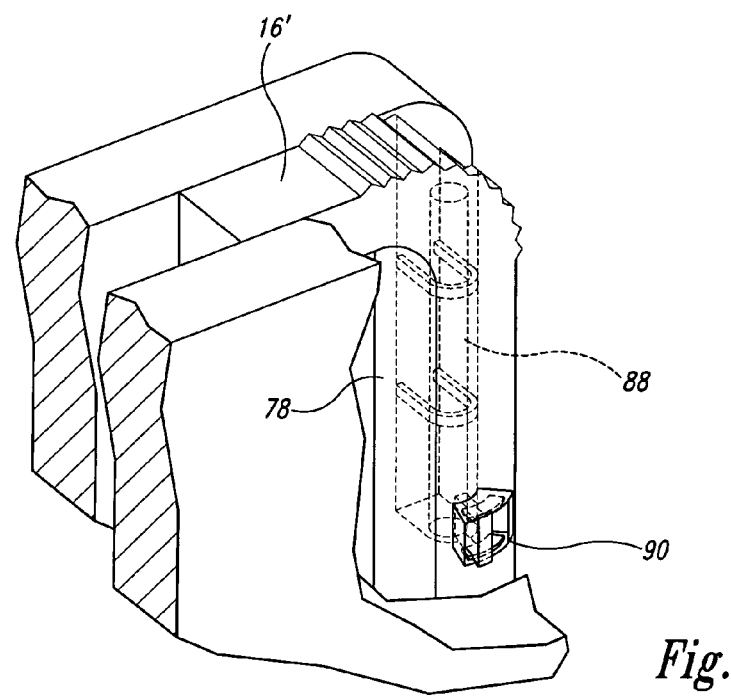
Fig. 19

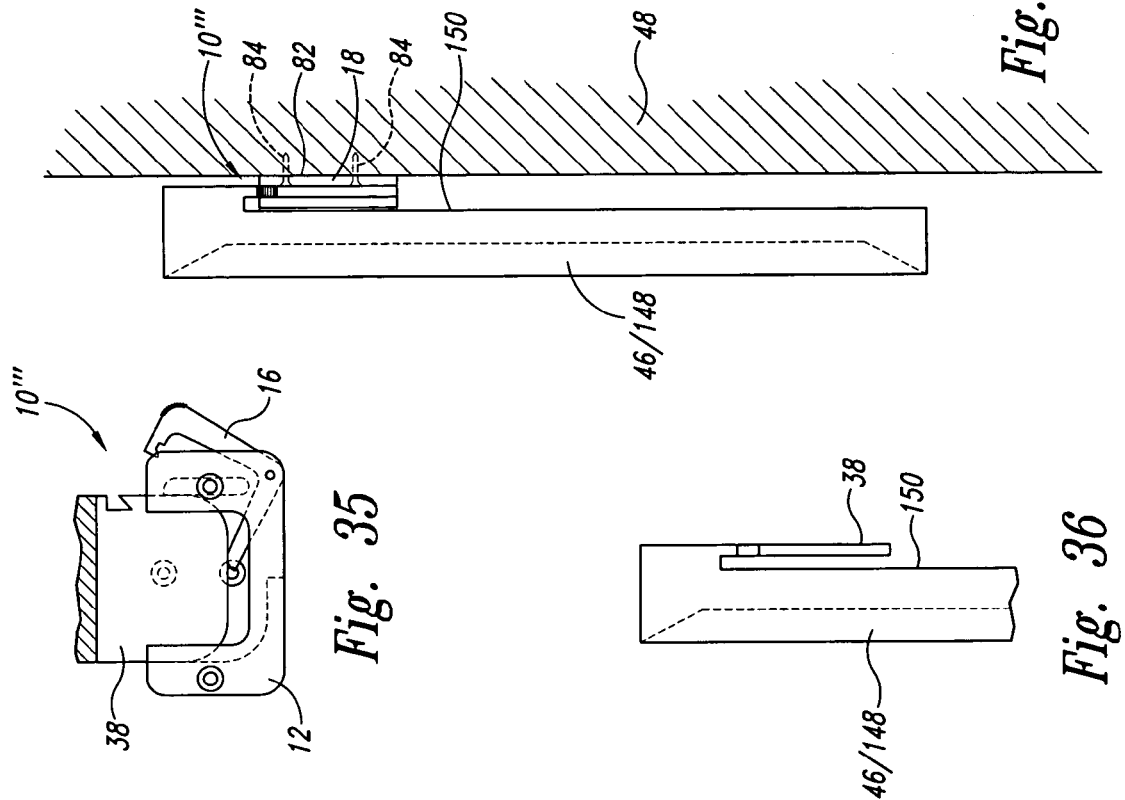
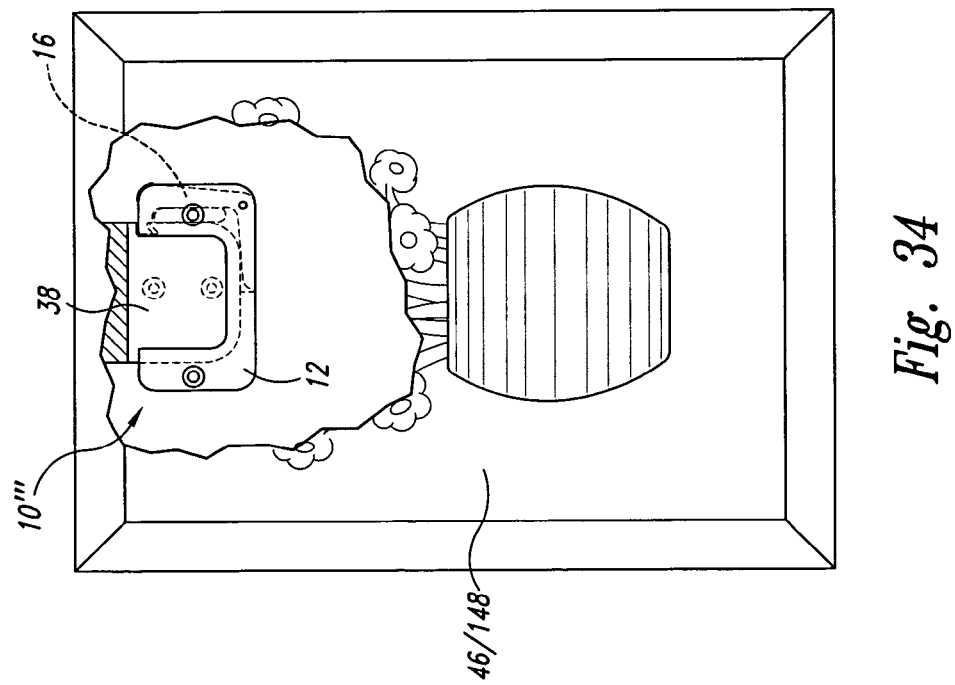

LOCKING ASSEMBLY

RELATED APPLICATION

The present application is a continuation-in-part of U.S. patent application Ser. No. 10/996,551 (Eric M. Moran, sole-inventor), filed Nov. 23, 2004 now U.S. Pat No. 7,077,372, and entitled "Locking Assembly For Mounting a Device to a Solid Surface."

TECHNICAL FIELD

The present invention relates generally to locking mechanisms or assemblies. In particular, the present invention relates to a locking assembly with a pivoting release lever for mounting a device to a surface.

BACKGROUND OF THE INVENTION

Notwithstanding the co-pending application to which the present application claims priority, known locking mechanisms for mounting a device to a surface include convoluted mechanisms that have stored energy springs or do not lock the device sufficiently to the surface. One such sliding latch is illustrated in the Nelson 1400 Dog Feeding Pan, in which a dog pan is attached to a vertical surface (e.g., a wall). The sliding latch does not lock the device to the surface (wall) and can be knocked off by a rambunctious pet.

Moreover, known locking mechanisms do not have simplicity of design and ease in installation and dislodging such a device, yet provide sufficient locking capabilities for joining a variety of devices to a solid surface.

Furthermore, known locking mechanisms make audible noise when locked or latched, which may be problematic for particular applications, such as those involving military or other tactical maneuvers.

SUMMARY OF THE INVENTION

The present invention is directed to a non-stored energy single motion locking assembly for attaching and locking a device to a surface that is easy to operate and has minimal moving parts that can break or fail.

The locking assembly of the present invention includes a bracket assembly having a front plate and a back plate joined about portions of peripheries of the front and back plates to form an opening therebetween having a top slot and at least one adjacent side slot. Positioned within the opening in the at least one side slot is at least one pivoting release lever having an upper leg and a lower leg joined together about a pivot. The pivot is attached to the front and back plates to allow the upper and lower legs of the pivoting release lever to rotate within the opening between the front and back plates about the pivot. The pivoting release lever further includes an outer surface that can be engaged to cause pivoting movement of the pivoting release lever.

The locking assembly further includes a yoke assembly having a yoke assembly plate that is of a size and shape to be received edgewise into the opening between the front and back plates via the top slot. A yoke is attached to the yoke assembly plate, with the yoke fixedly attached to a device that may be locked and mounted to the surface, as well as easily dislodged when desired.

The upper leg of the pivoting release lever and an upper portion of the yoke assembly plate include a pair of corresponding and interlocking notches that interlock the upper leg to the yoke assembly plate when the yoke assembly plate is fully inserted into the opening via the top slot. In this manner the device, being secured to the yoke, is secured and locked to the bracket assembly, of which at least a portion is secured to a surface such as a wall, a column, a plurality of bars, or even a belt or vest. Thus, the device is locked to the surface.

To unlock and dislodge the yoke assembly plate (and, ergo, the device) from the bracket assembly (and surface), a force is applied to the upper leg of the pivoting release lever via the outer surface of the pivoting release lever. The pivoting release lever moves the lower leg upward to apply a dislodging force onto the lower edge of the yoke assembly plate. Thus, the yoke assembly and device are unlocked from the bracket assembly and may be readily removed from the bracket assembly (and the surface).

The locking assembly of the present invention encompasses several embodiments. One is the addition of a second pivoting release lever used in tandem with the other pivoting release lever to dislodge large or heavy devices. Other embodiments dictate the shape of the interlocking notches. Yet another embodiment includes a tamper resistant pivoting release lever. Another embodiment includes a further restraint of a pair of magnets to restrain the pivoting lever in place when the notches are interlocked.

The present invention also includes variation on the securement means for securing the bracket assembly to the surface, whether via fasteners such as screws or set screws, an additional back plate, a non-planar adapter plate, belt, or adhesives.

Another feature of the present invention is that the locking assembly is substantially noiseless in use. The pivoting action of the pivoting release lever makes minimal noise such that the present invention is particularly applicable for tactical (e.g., military) maneuvers in which attaching and detaching a device to a belt or vest with little to no noise is highly desired.

These and other advantages will become more apparent upon review of the Drawings, the Best Mode For Carrying Out the Invention, and the Claims.

BRIEF DESCRIPTION OF THE DRAWINGS

Like reference numerals are used to designate like parts throughout the several views of the drawings, wherein:

FIG. 14 is an enlarged partial perspective view of the pivoting release lever of FIG. 12 (rotated 180 degrees) illustrating the cylinder barrel of the pivoting release lever shown in cutaway;

FIG. 15 is a perspective view of a key in which to activate the pivoting release lever by insertion of the key into the cylinder barrel of FIG. 14;

FIG. 16 is a bottom plan view of the key of FIG. 15;

FIG. 17 is a partial front view of an alternate embodiment of the key;

FIG. 18 is a bottom plan view of the key of FIG. 17;

FIG. 19 is a perspective view of the locking mechanism of the base assembly shown in cutaway for use with the tamper resistant pivoting release lever of FIG. 15;

FIG. 32 is a perspective view of the locking assembly of FIG. 1 utilized in securing a support collar to a surface (a wall is shown) for supporting and securing a vase and the like;

FIG. 34 is a front view of a framed art piece being secured to a solid vertical surface through another embodiment of the invention shown in cutaway;

FIG. 35 is a front view of the locking assembly of FIG. 34 illustrated in the detached and unlocked position;

FIG. 36 is a side view of the frame attached to a plate assembly; and

FIG. 37 is a side view of FIG. 34 with the plate assembly inserted and locked to secure the frame to a wall.

BEST MODE FOR CARRYING OUT THE INVENTION

Figure 1:
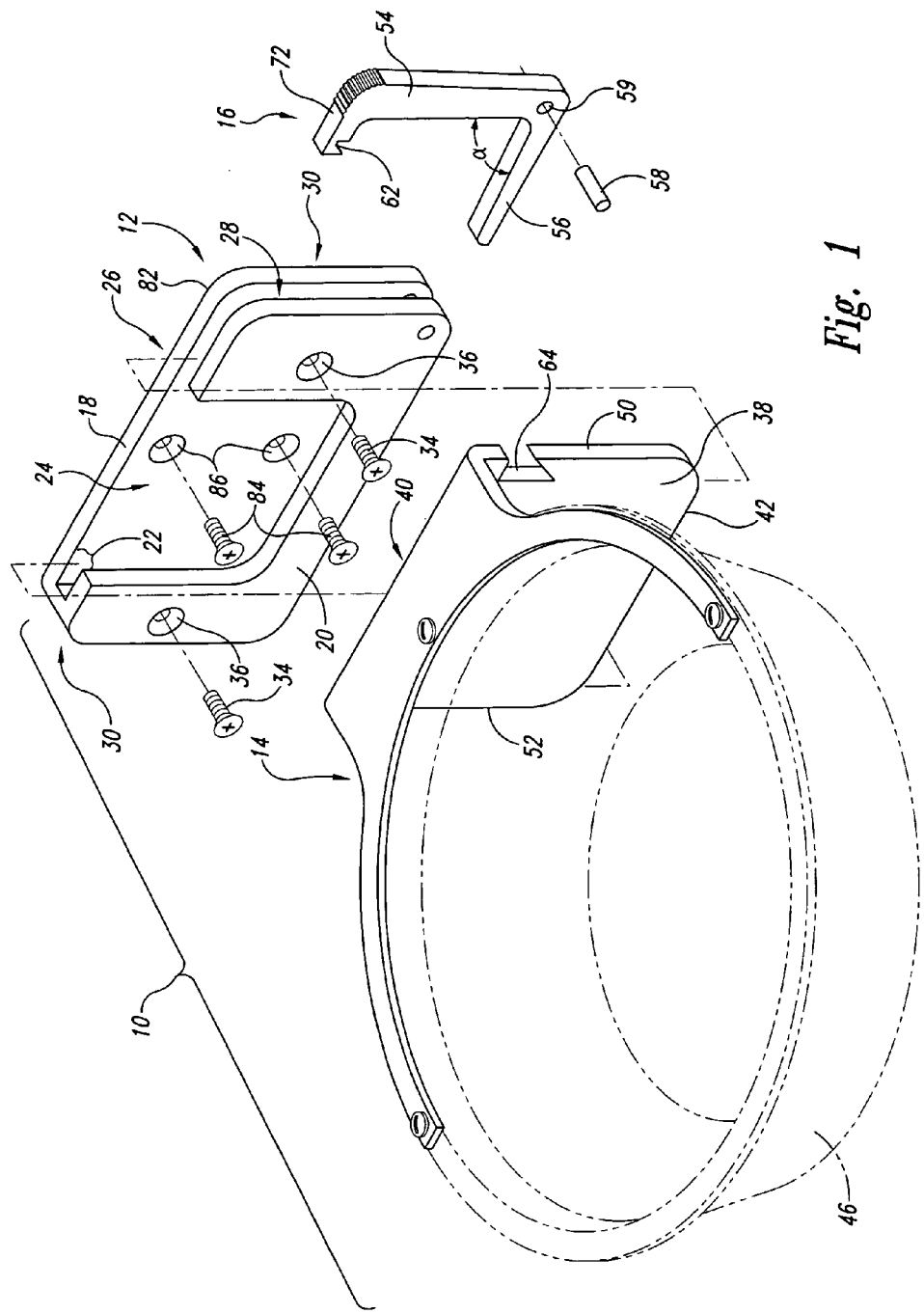
FIG. 1 is an exploded perspective view illustrating a bracket assembly, a pivoting release lever, and a yoke assembly of a first embodiment shown fixedly attached to a device (illustrated in phantom)
Figure 2:
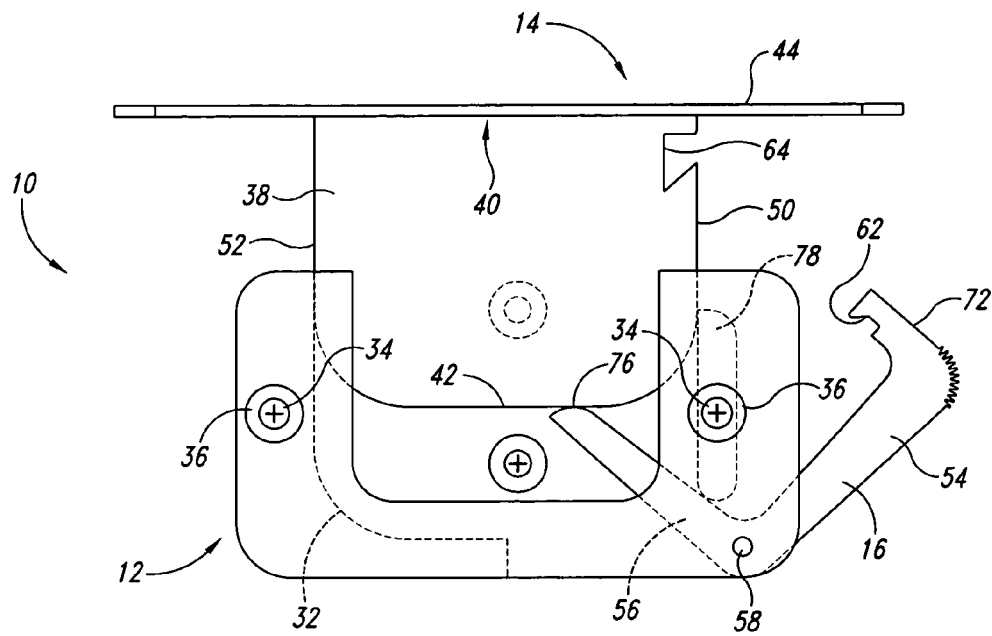
FIG. 2 is a front view of the assembled components of FIG. 1 (less the device) in the nearly fully dislodged and unlocked position.
Figure 3:
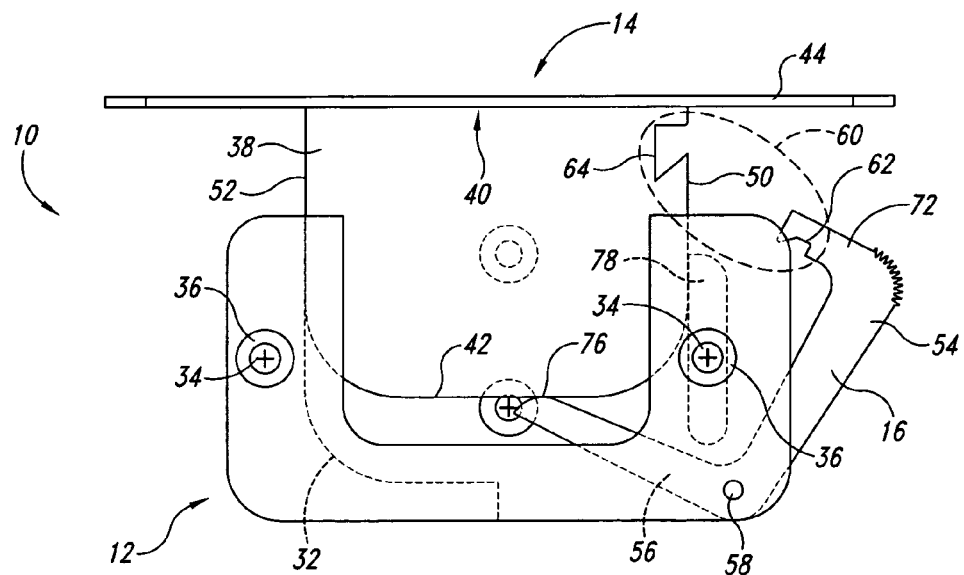
FIG. 3 is a front view similar to FIG. 2 where the assembled components are illustrated in the approximate half-way point of insertion or dislodge mode.
Figure 4:
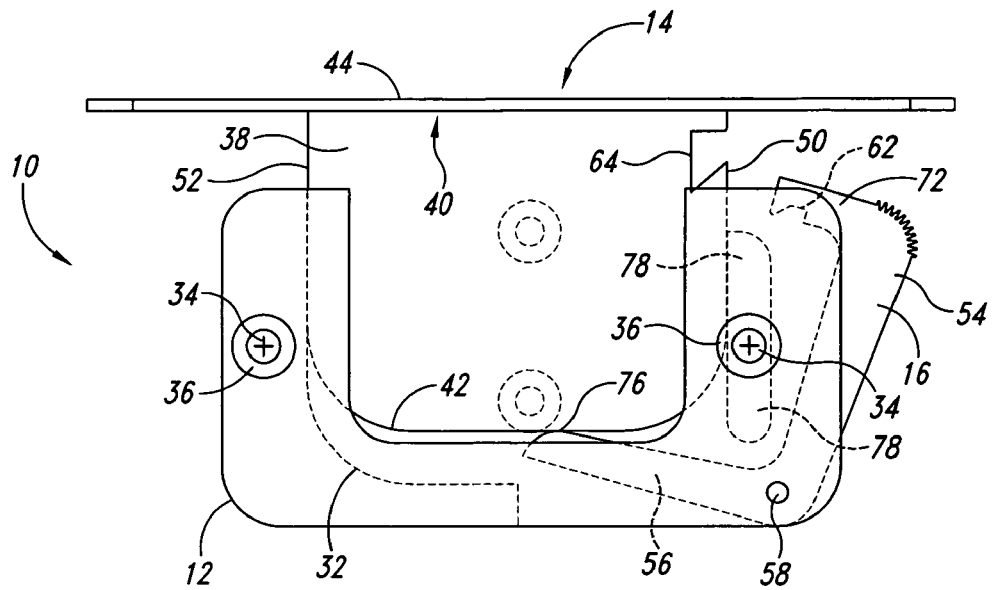
FIG. 4 is a front view similar to FIG. 3 where the assembled components are illustrated in the approximate ¾ of full insertion or approximate ¼ dislodge mode.
Figure 5:
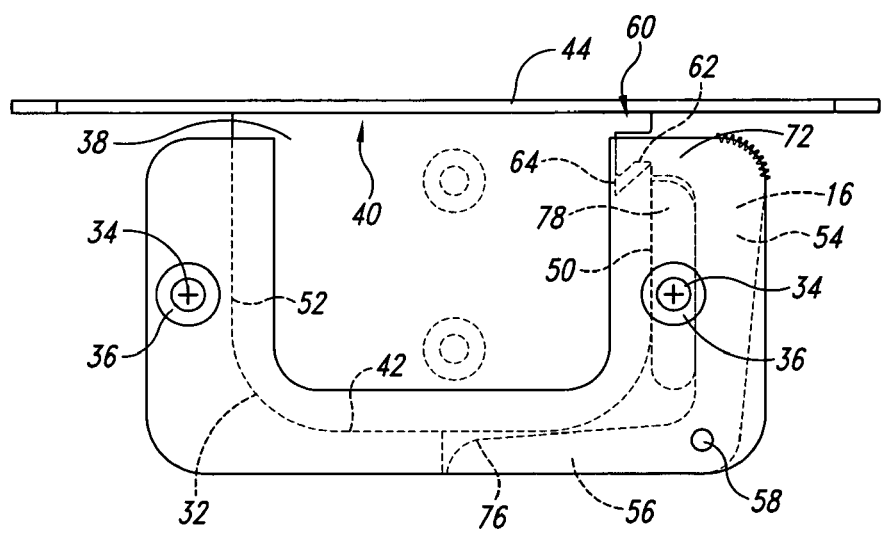
FIG. 5 is a front view similar to FIG. 4 where the assembled components are illustrated in the fully inserted and locked position.
Figure 6:
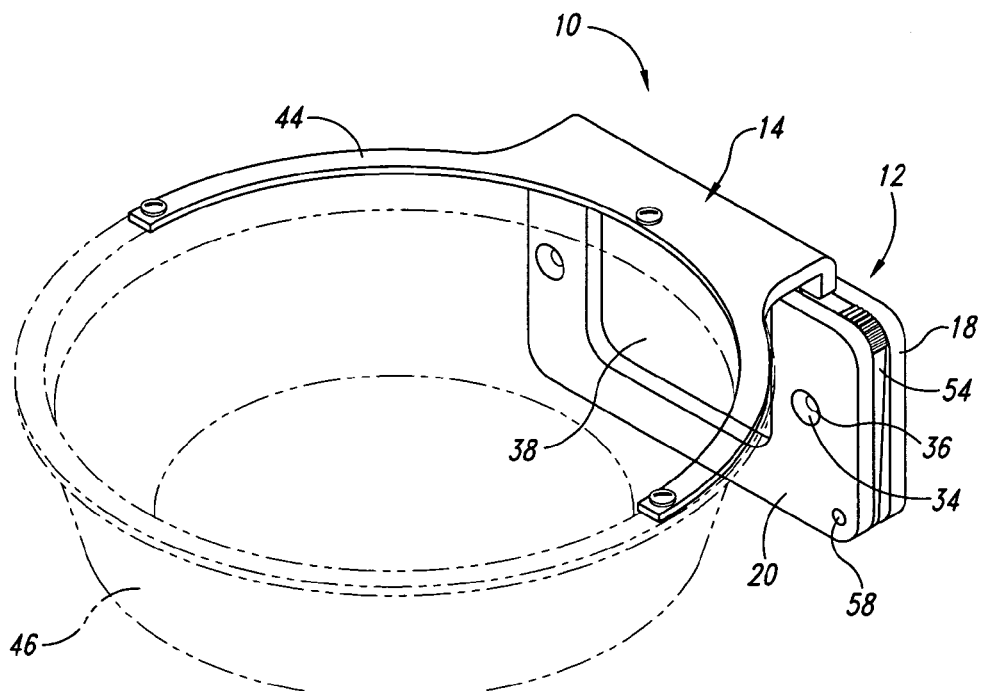
FIG. 6 is a perspective view of the assembled components of FIG. 1 in the fully inserted and locked position and with the device shown in phantom.

The invention is directed to an improved locking assembly claiming priority to Applicant's prior pending application Ser. No. 10/996,551 ("the '551 application"). Similar to the application to which the present invention claims priority, the locking assembly may be used to mount a device to a surface, such as a wall, floor, ceiling, column, table, belt or vest. The invention not only easily attaches and detaches the device to an adjacent surface, but includes improvements not fully appreciated in Applicant's prior co-pending '551 application, which is incorporated into the present application by reference.

Referring to FIGS. 1-7, the locking assembly 10 of the first embodiment includes a bracket assembly 12, and a corresponding yoke assembly 14, and a pivoting release lever 16, that, when assembled, allows quick secure fixation and locking of the yoke assembly to the bracket assembly through a single motion locking movement of the pivoting release lever. Similarly, dislodgement of the device and yoke assembly can be equally easily obtained through the reverse action via the pivoting release lever.

The bracket assembly may be formed of a substantially rectangular back plate 18 and a substantially conforming mostly rectangular front plate 20 that are conjoined and spaced apart in such a way as to form a substantially continuous opening 22 between back plate 18 and front plate 20. Opening 22 forms a top slot 24 at the top 26 of bracket assembly 12 and at least one side slot 28 on either or both sides 30 of the bracket assembly.

The front and back plates are joined together at portions of the peripheries of the two plates, with side slot 28 being accessible on at least one side 30. In one embodiment, the opposite side may be being joined to form an abutment edge 32, which will be discussed further below.

According to the preferred form, front plate 20 and back plate 18 are formed of two separate machined plates that are joined together primarily about portions of their peripheries by a plurality of fasteners 34, such as screws or rivets, which may be inserted into a plurality of apertures 36. If screws are used to fasten the front and back plates together, apertures 36 are preferably countersunk. Alternatively, the bracket assembly may be made of a unitary cast or molded piece in which the front and back plates are already joined at portions of the peripheries of the two plates.

Yoke assembly 14 includes a yoke assembly plate 38 having an upper "edge" 40 and a bottom edge 42. Yoke assembly plate 38 is of a size and shape to be received into top slot 24 such that bottom edge 42 of the yoke assembly plate 38 substantially conforms to the shape of the top slot and that substantially all of the yoke assembly plate 38 may be received edgewise within opening 22 via top slot 24. In preferred form, yoke assembly plate 38 is substantially rectangular in shape bordered by upper edge 40, bottom edge 42, and a pair of opposing and substantially parallel sidewalls 50, 52.

Figure 7:
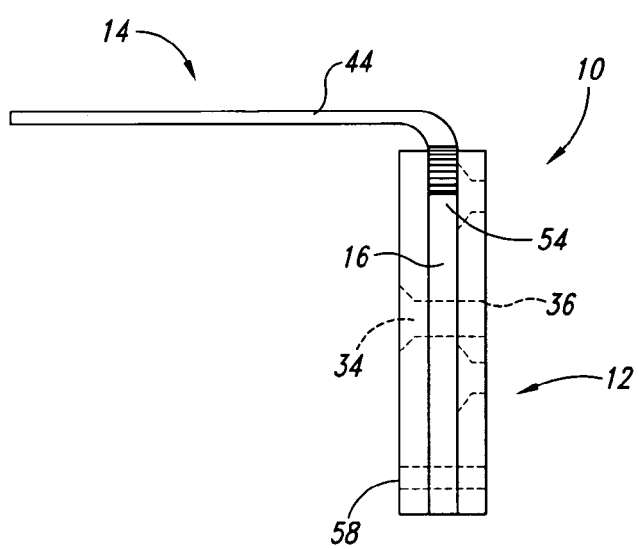
FIG. 7 is a right side view of the assembled components of FIG. 1 (less device) in the fully inserted and locked position.

In addition to yoke assembly plate 38, yoke assembly 14 includes a yoke 44 that is fixedly attached and extends outwardly from the yoke assembly plate 38. In one embodiment, the yoke is fixedly attached and extends outwardly from the upper "edge" 40 of the yoke assembly plate 38. According to another embodiment, the yoke is essentially perpendicular to the yoke assembly plate as best illustrated in FIG. 7. However, the yoke assembly also may be like the collar assembly designs illustrated in the '551 application.

Figure 8:
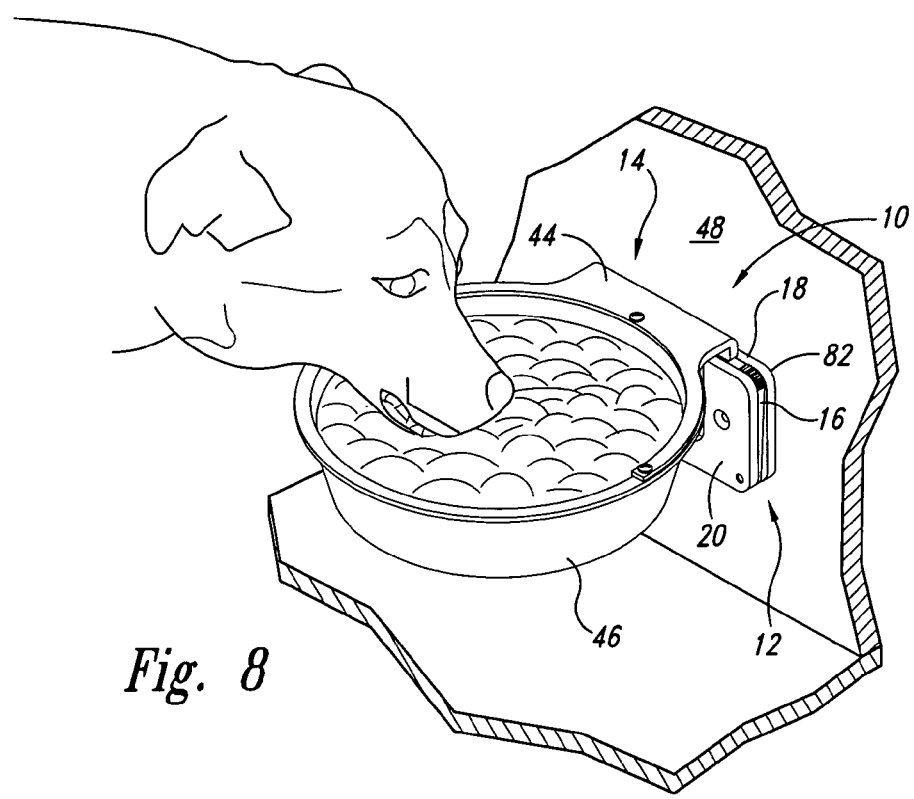
FIG. 8 is a perspective view of the assembled components of FIG. 1 and the device (dog dish) shown mounted to a surface (a wall) in the locked position.
Figure 9:
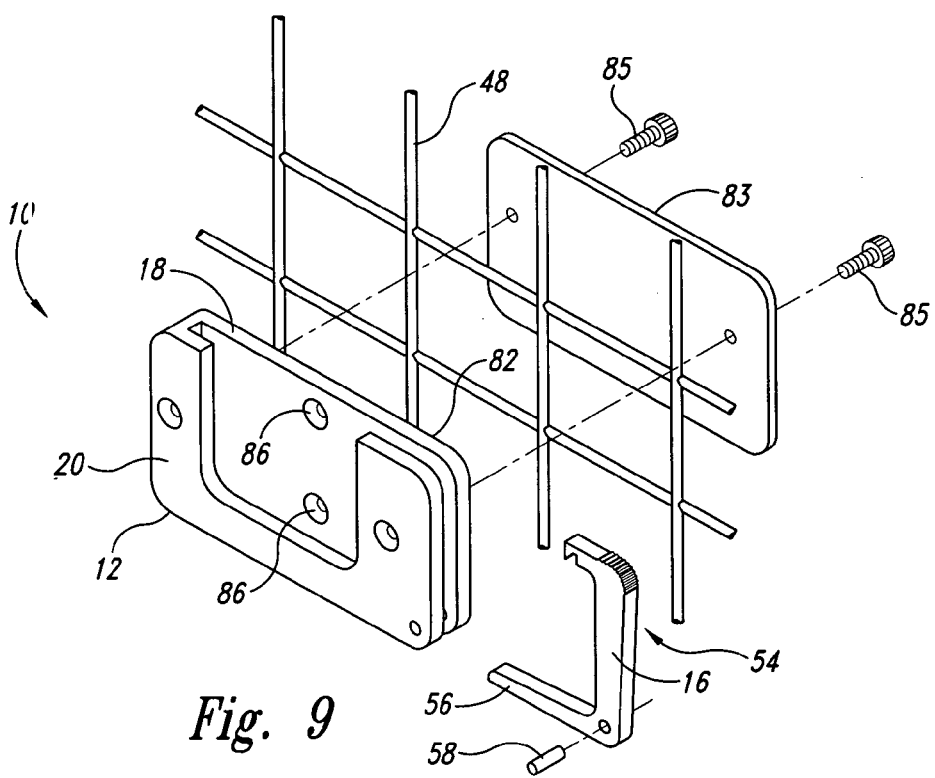
FIG. 9 is an exploded perspective view of an alternate mounting embodiment in which the bracket assembly further includes a separate back plate that is mounted to the bracket assembly about a plurality of bars via a pair of set screws.
Figure 10:
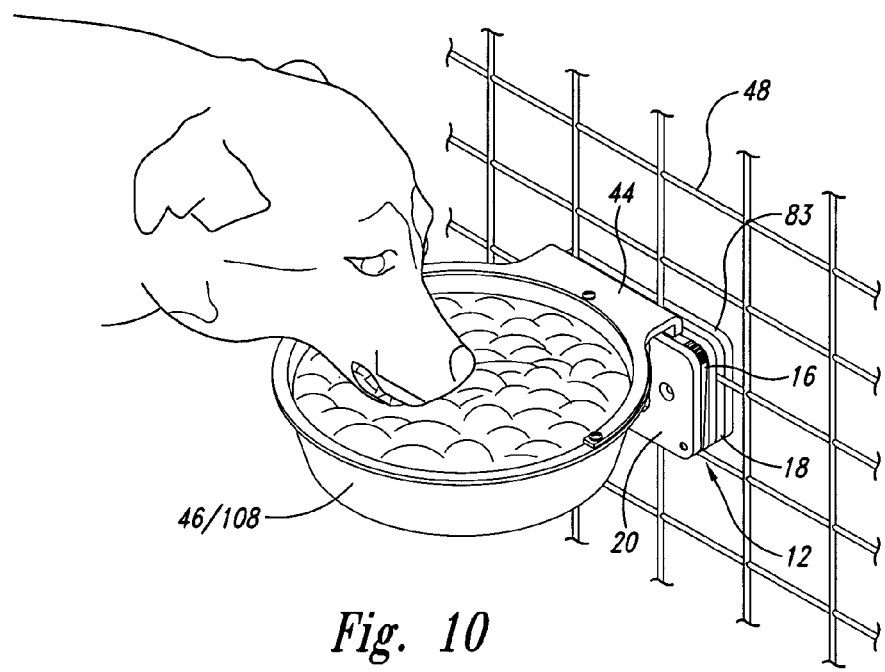
FIG. 10 is a view like FIG. 8 where the assembled components and device (dog dish) are mounted to a plurality of bars, such as in a kennel, in the locked position.
Figure 25:
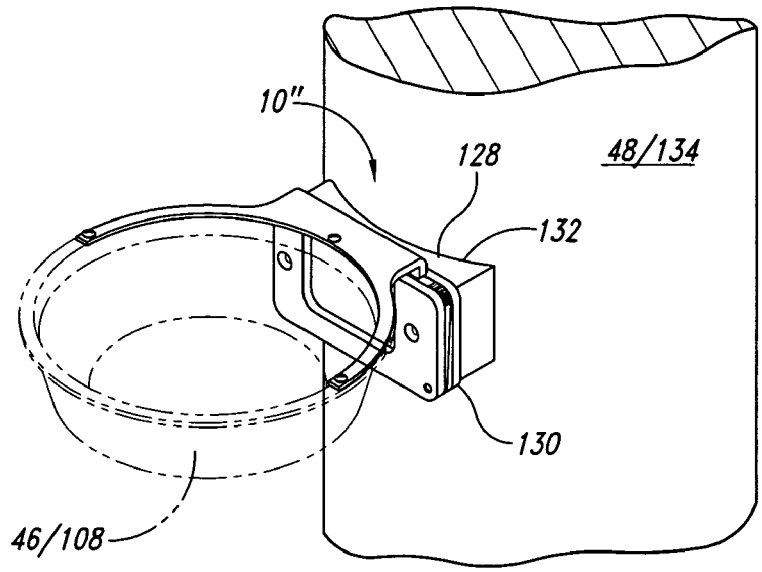
FIG. 25 is a perspective view of another embodiment of the locking assembly illustrated with an adapter plate to conform to a non-planar surface.

The yoke 44 is attached to a device 46 (see FIG. 8 for example) in order to readily secure and lock the device 46 to a surface 48 (e.g., a wall such as illustrated in FIG. 8, a non-planar surface such as illustrated in FIG. 25, or a plurality of bars such as illustrated in FIG. 10), and, upon need or desire, can dislodge/unlock and remove the device from the surface.

Figure 26:
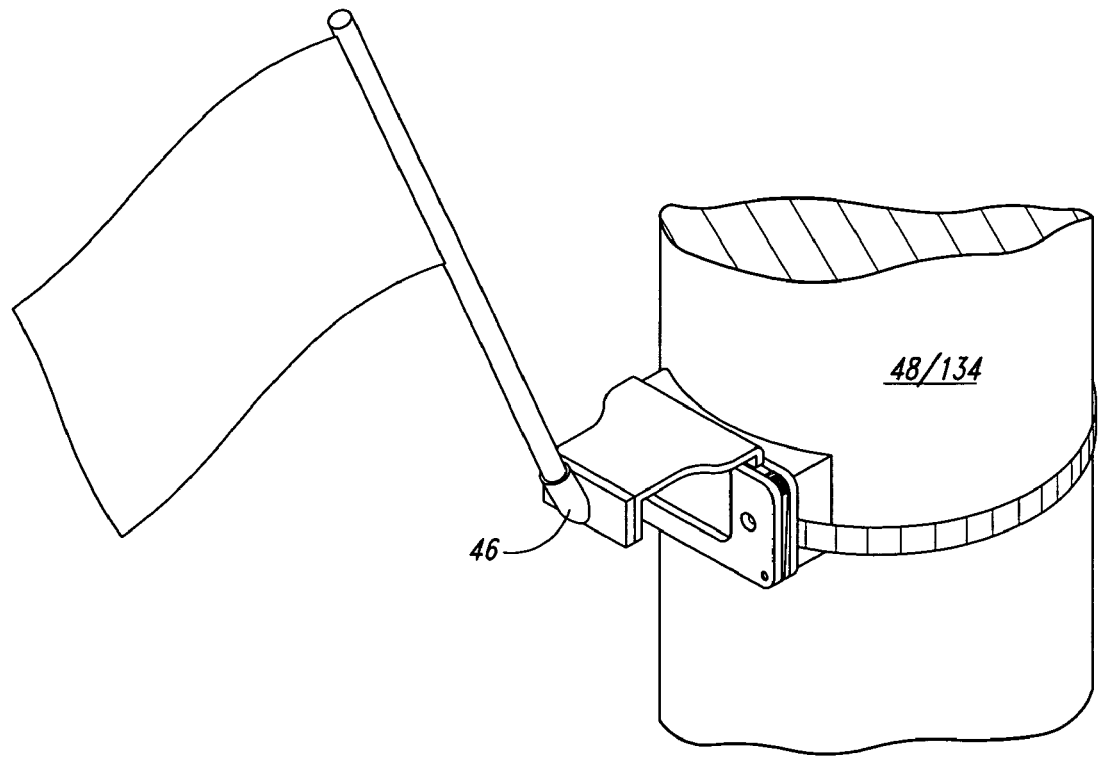
FIG. 26 is a perspective view similar to FIG. 25, except that the device is a flag pole holder that is integrally formed with the yoke assembly, and the bracket assembly is banded to a column via an adapter plate including a slot in which a band is thread side-to-side through the adapter plate.

The yoke may be varied, as illustrated in FIG. 1 or in FIG. 26. Alternatively, it may be eliminated altogether to mount the device directly into the yoke assembly plate, such as shown in FIG. 34. In another embodiment the yoke may be of a size to accommodate two dog dishes (not illustrated).

The bottom edge 42 of yoke assembly plate 38 is inserted into top slot 24 of bracket assembly 12, which may also have a substantially overall rectangular shape.

The pivoting release lever 16 includes a first upper leg 54 and a second lower leg 56 to which a pivot 58 intersects the two legs. In one embodiment, the two joined legs 54, 56 form an acute angle α between the two legs at the pivot. In preferred form, the angle α is near or at 90 degrees to form an approximate "L" shape (or backwards "L") consisting of legs 54 and 56 and pivot 58.

Figure 11:
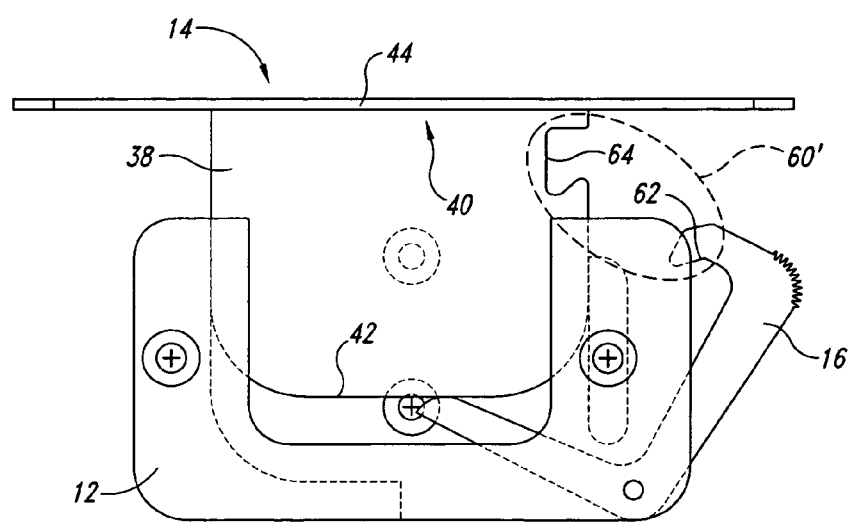
FIG. 11 is a view like FIG. 4, except showing an alternate interlocking notch arrangement.
Figure 12:
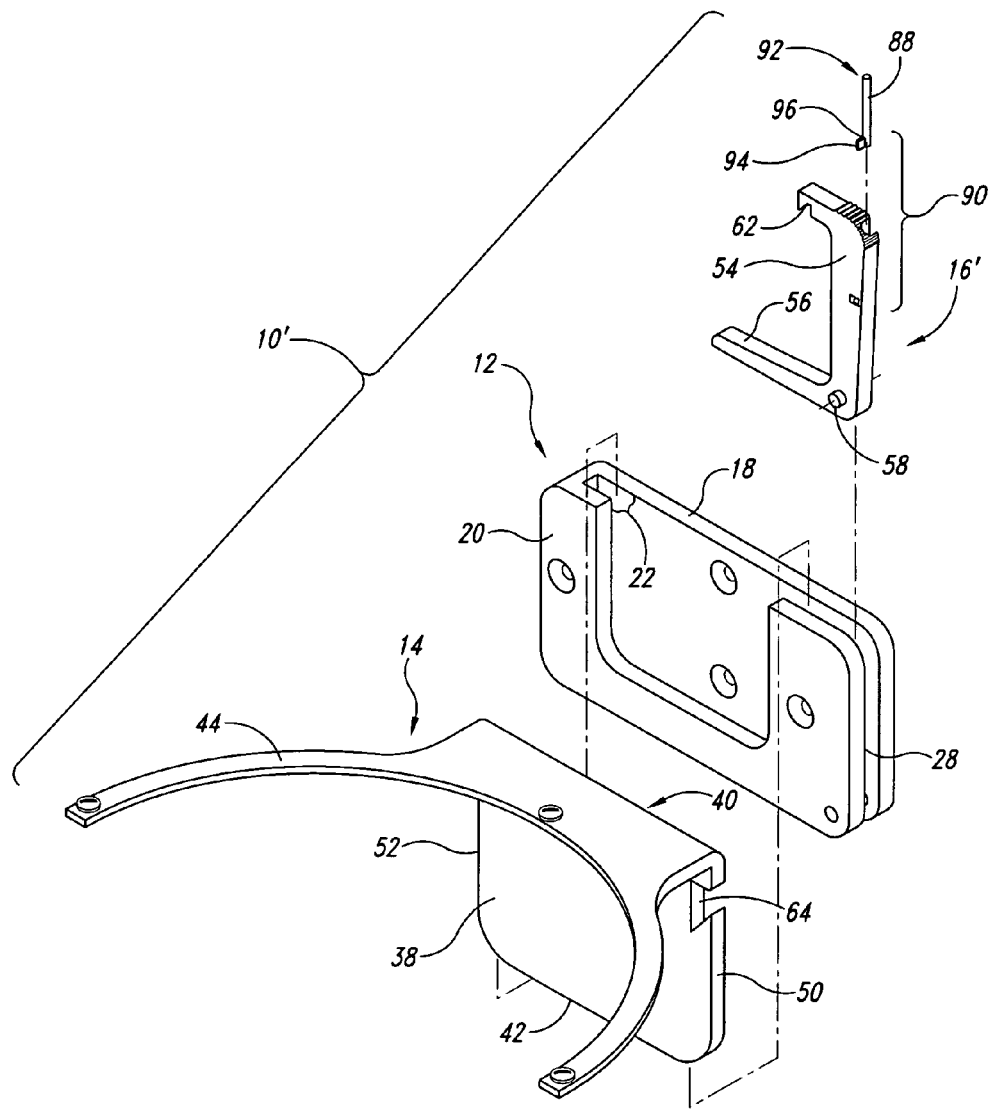
FIG. 12 is an exploded perspective view of a second embodiment having a tamper resistant pivoting release lever.
Figure 13:
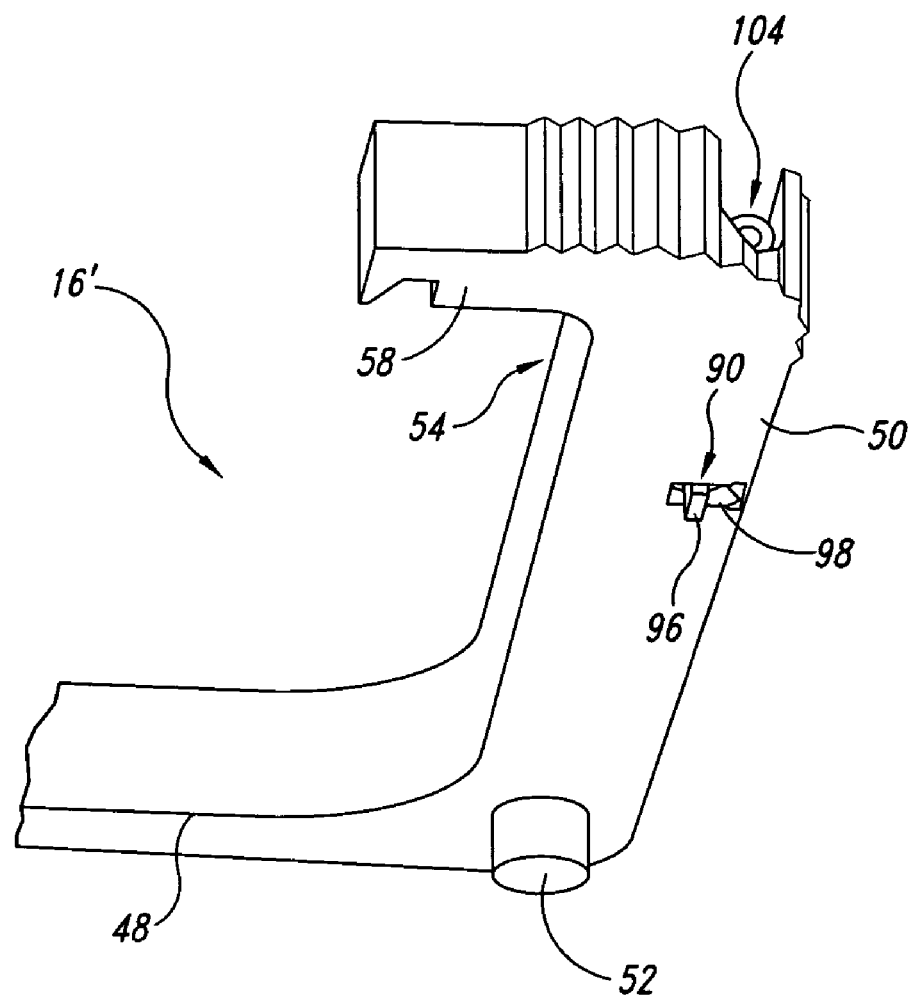
FIG. 13 is an enlarged top partial perspective view of the alternative tamper resistant pivoting release lever of FIG. 12.
Figure 22:
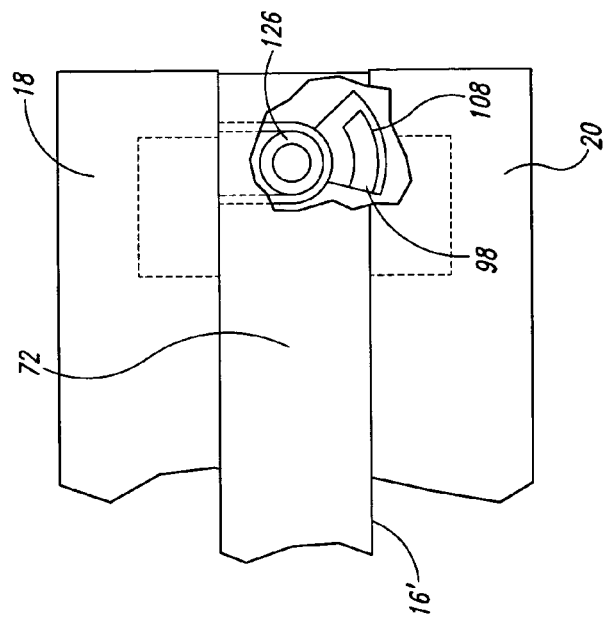
FIG. 22 is a partial top view of the assembled pivoting release lever locked to the front plate (locking mechanism shown in cutaway)
Figure 20:
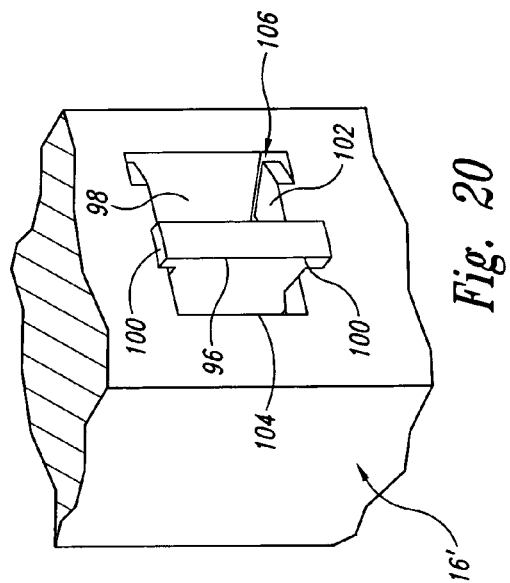
FIG. 20 is an enlarged perspective view illustrating the flange of the locking mechanism of the second embodiment in the locked position.
Figure 21:
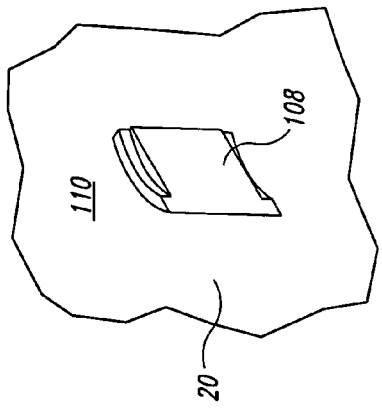
FIG. 21 is an enlarged partial perspective view of the back side of the front plate of the bracket assembly illustrating the catch to which the flange of FIG. 20 mates to lock the pivoting release lever to the front plate of the bracket assembly.
Figure 23:
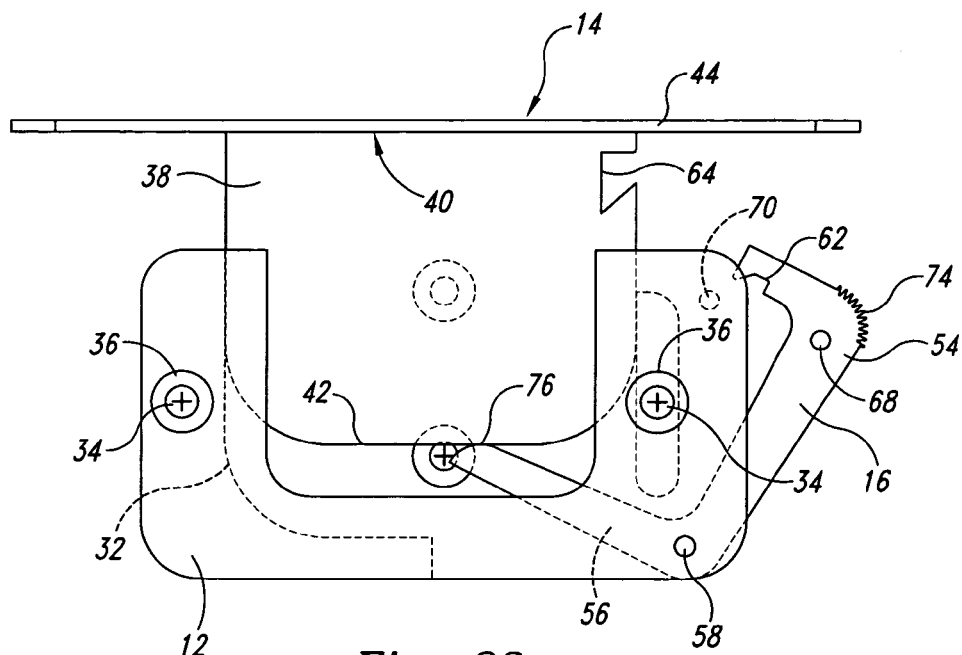
FIG. 23 is a front view of the assembled components shown with a magnet positioned on the upper leg of the pivoting release lever and a magnet positioned on the back plate of the bracket assembly.

The upper leg includes a restraint that mates with a corresponding restraint on an upper portion of the yoke assembly plate. The pivot may be a separate pin inserted within an aperture 59 within the pivoting release lever. In one embodiment, the restraint is a pair of corresponding and interlocking notches 60, one notch 62 formed on the upper arm of the pivoting release lever and the other notch 64 located on an upper portion of the yoke assembly plate. One such embodiment is the angled hook shape notch illustrated in FIGS. 1-7. Another shape notch 60' is illustrated in FIG. 11. However, the present invention encompasses varying mating or interlocking shapes. The restraint may be further solidified by adding a pair of corresponding magnets 66 with one magnet 68 positioned on the upper leg 54 and the other magnet 70 positioned on the back plate, as illustrated in FIG. 23. In this way, the magnets keep the pivoting release lever from pivoting movement when the bracket assembly is rotated or positioned on its side.

The upper leg may further include a flange 72 extending from the upper leg 54 to which the notch 60 is formed. The flange may act as a further restraint to keep the upper edge of the yoke assembly plate from movement in the locked position.

An outer surface 74 of the pivoting release lever can be engaged by an external force (e.g., a human thumb, finger, or mechanical device) in order to cause pivoting movement of the pivoting release lever when the device is to be dislodged from the bracket assembly. In one embodiment, the outer surface is a knurled surface, as illustrated in FIGS. 1-7 (amongst others). Alternatively, an external lever (illustrated in FIG. 1 of the '551 application) may be used to engage an external force.

Pivoting release lever 16 is positioned within opening 22 at side slot 28 between the back and front plates 18, 20 respectively. Pivot 58 is attached to the back and front plates, but still allowed rotational movement. Thus, pivot 58 secures pivoting release lever 16 to the back and front plates, but pivoting release lever 16 is free to move within opening 22 between the back and front plates 18, 20 about pivot 52 save for a retaining structure discussed below.

Referring particularly to FIGS. 2-6, at the other end of pivoting release lever 16 is a distal end 76 of lower leg 56. Distal end 76 makes contact with bottom edge 42 of yoke assembly plate 38 during insertion and release (see FIGS. 3, 4, and 5). The insertion of the yoke assembly plate 38 and yoke 44 into the top slot 24 of opening 22 between the front and back plates of the bracket assembly may be retained by abutment edge 32 and an oppositely situated elongated bar 78 applies a gravitational force onto the distal end 76 of leg 56. Elongated bar 78 is preferably parallel to the abutment edge 32 and may be formed of a separate strip fastened, adhered, or molded between the front and back plates. Elongated bar 78 also functions as a restraining piece to aid in locking/latching the pivoting release lever in place as discussed further below. Alternatively, a pair of spaced apart pins or even a sole pin positioned near the pivot may suffice to restrain pivoting movement of the upper leg within an identified boundary and aid alignment of the upper leg of the pivoting release lever into interlocking position with the upper portion of the yoke assembly plate.

When yoke assembly plate 38 is inserted edgewise into top slot 24, bottom edge 42 of yoke assembly plate 38 applies a force (e.g., a gravitational force) on distal end 76 of lower leg 56 that necessarily moves upper leg 54 about pivot 58 resulting in upper leg 54 moving upward and inward within side slot 28. When the yoke assembly plate 38 is fully inserted within the top slot and the bottom edge 42 of yoke assembly plate 38 has applied maximum force to the distal end 76 of lower leg 48 of pivoting release lever 16, the upper leg's flange 72 makes contact with an upper portion of the yoke assembly plate and the interlocking restraint (notches, with or without the addition of a magnetic restraint) couple to lock the pivoting release lever in place relative to the yoke assembly plate. The yoke assembly will not be dislodged from the bracket assembly until an external force is applied to the pivoting release lever.

The yoke assembly is readily dislodged from the bracket assembly by the reverse procedure. When the yoke assembly (and attached device) are to be removed from the mounted bracket assembly, a force is applied to knurled outer surface 74 (or alternate flange), which forces the distal end of the lower leg to apply an upward force to dislodge the bottom edge of the yoke assembly plate from the bracket assembly. At the same time, the pivot action releases the upper leg from its position to restrain movement of the yoke assembly plate and the coupled interlocking notches and/or magnetic attraction between the two magnets is broken.

Elongated bar 78 not only forms a barrier to which restrains yoke assembly plate 38 from lateral movement toward side slot 28, but it may also function to restrain upper leg 54 of pivoting release lever 16 from rotational movement into the part of opening 22 that yoke assembly plate 38 is received. An upper portion 80 of elongated bar 78 is positioned adjacent and below flange 72 in order to support and guide the flange and restraint (e.g., notches) in the locking positioning over at least the notch of the upper portion of the yoke assembly plate.

The pivoting release lever's single motion locking action, especially within the confines of the guide and shape of the flange and restraint of the upper leg relative to the positioning of the upper portion of the yoke assembly plate, all perform their intended function, e.g., lock, dislodge, in relative quiet. This nearly noiseless feature has benefits discussed in more detail below.

As will be discussed further below, a back surface 82 of back plate 18 is fixed directly or indirectly to a surface 48, whether a wall, column, floor, ceiling, belt, vest, or trailer hitch. For relatively planar solid surfaces, back surface 82 is directly secured to the planar solid surface by means of fasteners 84 (e.g., screws through apertures 86, nails, rivets), or may be adhered to the surface. When attaching the bracket assembly to a plurality of bars (e.g., a kennel wall) a separate back plate 83 may be used to sandwich the bars between back surface 82 and separate back plate 83. The bracket assembly is attached to the bars via the separate back plate by a plurality of fasteners, such as set screws 85. Other well known fastening means for securing back surfaces to the surface may be used as well. Securement of the bracket assembly to non-planar surfaces is discussed in more detail below.

As discussed briefly above, the device 46 is fixedly attached to the yoke of yoke assembly 14, whether through traditional fastening (e.g., screws, rivets) or adhesive means, or the device and yoke are integrally formed. In either form, the device is fixedly attached to the yoke assembly, which when locked into the bracket assembly securely locks the device to the solid surface until a user intends to dislodge the device from the solid surface.

Referring now to FIGS. 12-22, a second embodiment of the invention 10' includes a tamper resistant pivoting release lever 16' in which a tamper-resistant barrel 88 (FIGS. 13-14) and locking mechanism 90 are added (FIG. 12, FIGS. 19-22).

Barrel 88, which is illustrated in a cylindrical shape, is of a shape to conform to a corresponding external key 92 (FIG. 15). Barrel 88 includes top end 92 and bottom end 94. At the bottom end 94 is a flange 96 that is moved within a slot 98 between a locked and unlocked position. In one embodiment, the flange 96 includes its own flanged ends 100 and slot 98 includes a spacer 102 along most of the arc-like path that the flange 96 travels within the slot. The exception is that at one end 104 of slot 98, a rotational force is applied to flange 96 in order to dislodge the flange 96 from a space 106 to which the spacer does not extend (where the flange 96 is unlocked relative to space 106 in slot 98 and allows rotational movement of the pivoting release lever 16' within opening 22).

Flange 96 with its own flanged ends 100 conforms to a catch 108 (FIG. 21) that is formed within a back surface 110 of front plate 20. When the flanged ends 100 of flange 96 are rotated in the locked position, they are restrained by catch 108 on the back surface of front plate 20, which restrains flange 96 (and ergo pivoting release lever 16') to front plate 20. Therefore, pivoting release lever 16' is locked into place with the restraint of the upper leg positioned over the corresponding upper portion of yoke assembly plate 38, thereby locking the plate and the yoke assembly to the bracket assembly.

Now referring also to FIGS. 14-16, key 92 consists of an elongated lower member 112 having a small cross-sectional area and an upper handle grip 114. Lower member 112 is of a shape to correspond and be inserted into barrel 88 and includes a distal end 116 having a specific shape that corresponds to small plate 118 at the base of barrel 88. Examples of such shapes are illustrated in FIGS. 16-18, such as a star notch shape 120 (FIG. 16) or a "snake eyes" shape 122 in FIG. 18 of an alternate distal end 112' shown in FIG. 17.

Upper handle grip 114 is of larger diameter (or surface area) than that of the cross section of the lower member 112 in order to more readily access the handle grip and rotate the key during use and to position lower member 112 into barrel 88 at a set length. At the base of upper handle grip 114 is a lower surface 124 that makes contact with the upper surface 126 of barrel 88 when lower member 112 of key 92 is inserted into barrel 88.

The mating of the particular notched shape at distal end 116 of key 92 with plate 118 of barrel 88 within pivoting release lever 16' allows rotational movement in a step progression when a rotational force is applied to key 92 (e.g., turning the handle grip 114 in a clockwise direction to lock the flange 96 against catch 108 of front plate 20).

In the locking mode, the yoke assembly plate 38 of the yoke assembly is inserted edgewise into top slot 24 between front and back plates 20, 18 similar to the locking operation of the first embodiment of FIGS. 1-8. The insertion and rotation of key 92 into barrel 88 with distal flange 96 rotationally moving between an unlocked and locked position within slot 98 and catch 108 of front plate 20 when the bottom of key 92 mates with barrel end plate 118. This action, in turn, restrains pivoting movement of the pivoting release lever 16' relative to the front plate.

To unlock the pivoting release lever and, thereby, dislodge yoke assembly plate 38 (and ergo the yoke assembly 14') from the bracket assembly, key 92 is inserted within barrel 88 and rotated in the opposite direction from the movement made in the locking mode. Flange 96 is released from catch 108 and is no longer restrained against front plate 20. Pivoting release lever 16' is free to pivot about pivot 58. If key 92 is still inserted into barrel 88, a user may use the handle grip of the key to apply a downward force onto pivoting release lever 16' about pivot 58. This causes a force to be applied to bottom edge 42 of yoke assembly plate 38 and dislodges yoke assembly 14' (or 14) from its seated position.

Figure 24:
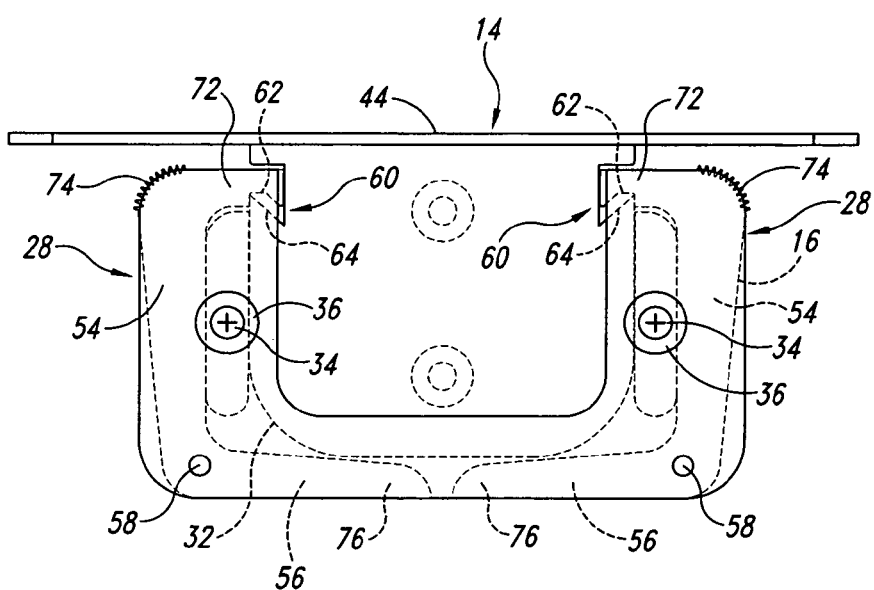
FIG. 24 is a front view of another alternate embodiment of the locking assembly in which there are two oppositely situated pivoting release levers that lock or dislodge the yoke assembly plate as desired.

In yet another embodiment of the invention, as best illustrated in FIG. 24, the invention may include two pivoting release levers 16 oppositely situated and positioned within two side slots 28 of the opening 22 between the front and back plates of the bracket assembly. The two lower legs 56 of each pivoting release lever 16 are positioned to apply a force to the bottom edge of the yoke assembly plate 38 when dislodging the yoke assembly plate 38 (and ergo the device) from the bracket assembly 12. The upper legs 54 of each pivoting release lever may both include a notch 62 that interconnects with a corresponding notch 64 on the yoke assembly plate 38 during the locked position. This embodiment may be desirable for exceptionally heavy or large devices that are attached to the locking assembly.

Referring again to FIG. 8, a main feature of the invention is the ease to which a device 46 may be readily attached and detached from a surface 48, such as a wall. FIG. 8 illustrates one of many devices 46 of which easy attachment and detachment to a wall or other solid surface is desirable. In that figure, a dog dish (device) 108 is fixedly attached to yoke assembly 14. The entire dog dish can be readily attached to wall 48 by inserting the plate of the yoke assembly into the top slot of the bracket assembly and locking the top edge of the plate by the hold-down flange of the pivoting release lever (in any of the embodiments discussed above). The locking assembly secures the dog dish to the surface (wall) more securely than known sliding latches. This locking assembly application is particularly useful for rambunctious pets or pets that are wearing conical collars as part of medical convalescence as the dish can be easily mounted off the floor. Similarly, the dish is readily detached from the wall (for cleaning, refilling, etc.) by unlocking the pivoting release lever and applying a downward force on the lever to dislodge the plate and yoke assembly from mounted bracket assembly.

At least the back plate of the bracket assembly is fixedly attached to a solid surface (e.g., wall, ceiling, and floor) through a plurality of fasteners, as discussed above, or through adhesives or epoxies, magnets, or through other conventional fastening techniques. The locking assembly of the present invention may be of various sizes, depending on the weight and size of the load being secured to the solid surface. For a small locking assembly carrying a relatively small weight, a single fastener may be utilized to secure at least the back plate to the solid surface.

Now referring to FIGS. 25-26, another embodiment of the locking assembly 10" may include a non-planar adapter plate 128 having a planar front side 130 and a non-planar back side 132 of a size to conform to a non-planar solid surface 134. The adapter plate is fixedly attached to the back surface 132 of back plate 18 of bracket assembly 12 (fastened or adhered in FIG. 25 and via banding in FIG. 26). In the embodiment illustrated in FIGS. 26 and 27, the adapter plate 128 may include a slot 136 of a size and shape to support a band or belt 138. One end of the belt enters one side of the adapter plate and exits out the other side. The non-planar back side 132 is then fastened, banded, or otherwise fixedly adhered to the non-planar surface 134 (such as a column, as illustrated in FIGS. 25 and 26) to which the device is desired to be attached. The non-planar back side 132 may be attached to the non-planar surface 134 as discussed above.

Figure 28:
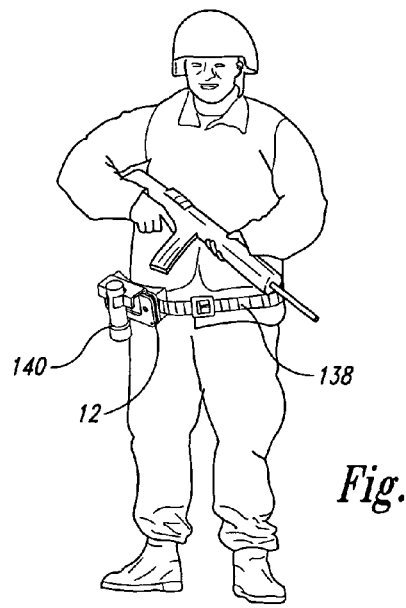
FIG. 28 is a perspective view illustrating a person wearing the belt and bracket assembly (shown exaggeratedly enlarged for clarity) of FIG. 27 with a device (flashlight) integrally attached to the yoke assembly.
Figure 29:
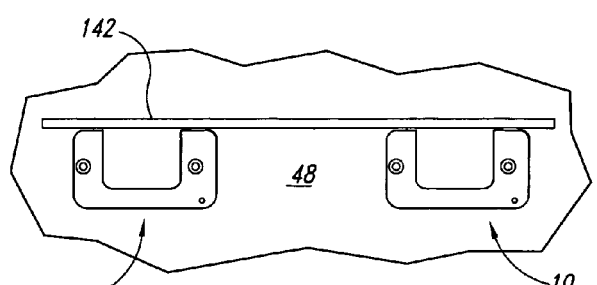
FIG. 29 is a front view of a shelf being supported and secured to an adjacent wall by a pair of spaced-apart locking assemblies as illustrated in FIG. 1.
Figure 30:
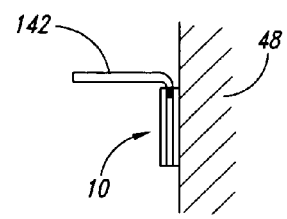
FIG. 30 is a side view of FIG. 29.
Figure 31:
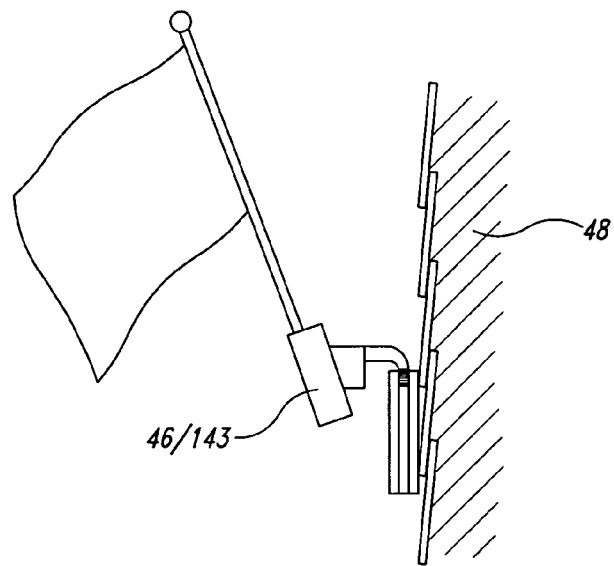
FIG. 31 is a perspective view of the locking assembly of FIG. 1 utilized in securing a rod holder (flag pole holder) to a surface (exterior wall of a house)
Figure 32:
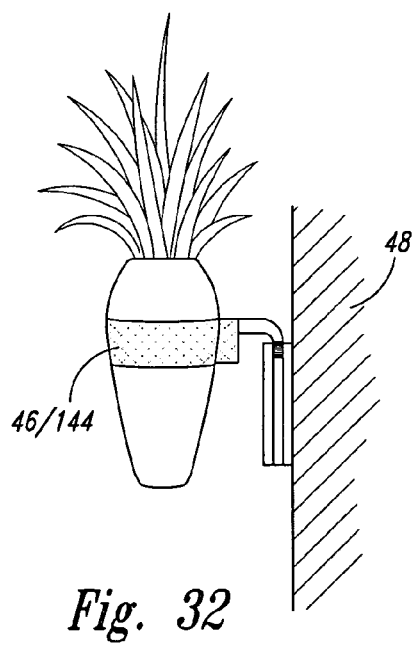
Figure 33:
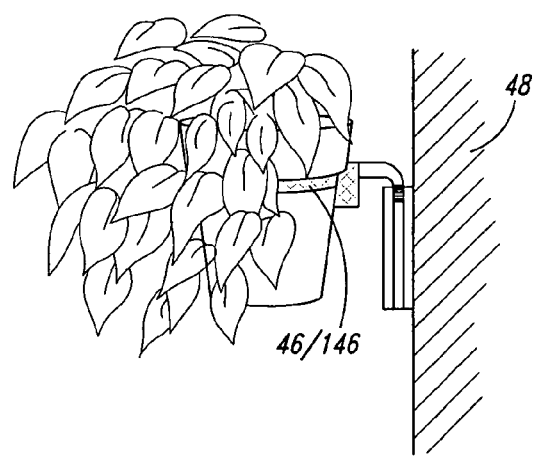
FIG. 33 is a view like that of FIG. 32 in which the support collar is supported and securing a potted plant to a surface.

Although the non-planar adapter plate 128 provides maximum manufacturing flexibility, a unitary non-planar bracket assembly 12 may be molded or cast as illustrated in FIG. 28.

Figure 27:
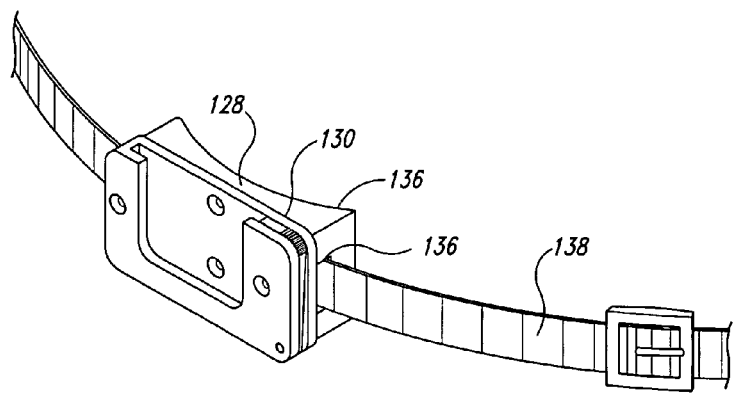
FIG. 27 is an enlarged view of the embodiment illustrated in FIG. 26, except that the banding is a belt that can be worn by a person.

Referring also to FIG. 28, the embodiment of FIG. 27 in which a band or belt 138 (or even rope) may be secured through the adapter plate, or even a slot with in the back plate 18 discussed above, may be worn by a person in order to attach personal or tactical items in a substantially noiseless way. In the embodiment illustrated in FIG. 28, a soldier can quickly and quietly attached or detach important tactical equipment, such as flashlight 140 (as shown).

The locking assembly of all embodiments may be metal, such as brushed aluminum, or a lightweight plastic or other manmade material (e.g., GE's LEXAN brand plastic) or molded from a durable polymer. The locking assembly may be of varying size per application. Additionally, more than one locking assembly may be required for certain applications.

Referring also to FIGS. 29-34, the applicability of the locking assembly of the present invention is varied. For example, the yoke may be fixedly attached to a dog dish 108 (as discussed and illustrated in FIG. 8). Other applications may include a modified yoke or device attached directly to the yoke assembly plate. Such devices include a shelf 142 (FIGS. 29 and 30), a rod holder (e.g., a flagpole or a fishing pole holder) 143 (FIG. 31), a vase or other three-dimensional art collar 144 (FIG. 32); a plant pot holder 146 (FIG. 33), or framed art 148 (FIGS. 34-37).

Referring particularly to FIGS. 34-37, the locking assembly 10''''s yoke assembly plate 38 is attached to the back 150 of a conventional frame 148 and inserts directly into top slot 24 of the opening 22 between the front and back plates 20, 18 of the bracket assembly 12.

Advantages of the present invention include a locking assembly or mechanism that can readily attach and lock a device to a surface or unlock and dislodge the device from the surface and the locking/dislodging action is accomplished through a single motion defined by the pivoting release lever. The locking assembly of the present invention requires no complicated stored energy mechanism. Moreover, the smooth, pivoting action in connection with the locking mechanism functions to lock a device to a solid surface in which noise is minimized. The illustrated embodiments are only examples of the present invention and, therefore, are non-limitive. It is to be understood that many changes in the particular structure, materials, and features of the invention may be made without departing from the spirit and scope of the invention. Therefore, it is the Applicant's intention that his patent rights not be limited by the particular embodiments illustrated and described herein, but rather by the following claims interpreted according to accepted doctrines of claim interpretation, including the Doctrine of Equivalents and Reversal of Parts.

What is claimed is:

1. A locking assembly for readily attaching and dislodging a device to and from a surface, the locking assembly comprising:
    a bracket assembly having a front plate and a back plate spaced apart and fixedly attached to each other about portions of peripheries of the front and back plates to form an opening therebetween having a top slot and at least one adjacent slide slot;
    a yoke assembly having a yoke assembly plate with an upper portion and a bottom edge; said yoke assembly plate being of a size and shape to be received and guided into the top slot between the front and back plates via the bottom edge of the yoke assembly plate, said yoke assembly further including a yoke in which a portion of the yoke extends from and is fixedly connected to the yoke assembly plate, and another portion of the yoke is fixedly attached to the device;
    at least one pivoting release lever positioned within the side slot between the front and back plates of the bracket assembly, said pivoting release lever having an upper leg and a lower leg interconnected by a pivot that is attached to the front and back plates of the bracket assembly such that the pivoting release lever can freely pivot within the opening between the front and back plates about the pivot within a defined boundary between a locked and dislodged position; said pivoting release lever further having an outer surface that can be engaged by an external force in order to cause pivoting movement of the pivoting release lever;
    a pair of interlocking notches corresponding with each pivoting release lever with one interlocking notch positioned on the upper leg of the corresponding pivoting release lever and the other interlocking notch positioned on an upper portion of the yoke assembly plate to interlock and restrain pivoting movement of the corresponding pivoting release lever relative to the yoke assembly plate when the yoke assembly plate is substantially inserted within the opening between the front and back plates of the bracket assembly via the top slot;

wherein an upper surface of the lower leg is positioned within the opening to be below the bottom edge of the yoke assembly plate; and at least one fastener to secure at least the back plate of the bracket assembly to the surface.

2. The locking assembly according to claim 1 wherein there are two oppositely situated pivoting release levers that are positioned about the yoke assembly plate assembly when the yoke assembly plate is fully inserted within the opening between the front and back plate via the top slot.

3. The locking assembly according to claim 1 wherein one of the interlocking pair of notches has an angled end hook defined within the upper leg of the pivoting release lever and the other notch has a complementary shape notched within the yoke assembly plate.

4. The locking assembly according to claim 1 wherein one of the interlocking pair of notches has a curved protrusion and the upper end of the yoke assembly plate has a corresponding female shape defined within it.

5. The locking assembly according to claim 1 wherein the back plate further includes at least one aperture to accommodate a screw fastener.

6. The locking assembly according to claim 5 wherein there are two screw fasteners and two apertures.

7. The locking assembly according to claim 1 wherein the at least one pivoting release lever is further restrained through an elongated bar that is fixedly attached to at least the front or the back plate and positioned therebetween to act as an abutment to restrain certain pivoting movements of the pivoting release lever within the side slot.

8. The locking assembly according to claim 1 wherein the yoke extends from and is fixedly attached to the upper portion of the yoke assembly plate.

9. The locking assembly according to claim 8 wherein the yoke extends substantially perpendicular from the upper portion of the yoke assembly plate.

10. The locking assembly according to claim 1 wherein the upper and lower legs of the pivoting release lever form an angle when joined at the pivot.

11. The locking assembly according to claim 10 wherein the angle between the upper and lower legs of the pivoting release lever is substantially 90 degrees.

12. The locking assembly according to claim 1 wherein the yoke plate assembly has an overall shape resembling a rectangle in which there are two opposing and substantially parallel side edges and two opposing and substantially parallel base and upper portion edges.

13. The locking assembly according to claim 12 wherein the yoke extends from and is fixedly attached to the upper portion of the yoke assembly plate.

14. The locking assembly according to claim 13 wherein the yoke extends substantially perpendicular from the upper portion of the yoke assembly plate.

15. The locking assembly according to claim 1 wherein the back plate of the bracket assembly is of a shape to conform to a non-planar solid surface.

16. The locking assembly according to claim 15 wherein the back plate of the bracket assembly is fixedly adjoined to an adapter plate, where the adapter plate has a back surface of a shape to conform to a non-planar solid surface.

17. The locking assembly according to claim 1 wherein the bracket assembly further includes a separate plate having at least one aperture to accommodate a fastener, said separate plate being adjacent but not affixed to the outer surface of the back plate of the bracket assembly, such that at least one fastener is used to fasten the locking assembly to a plurality of bars sandwiched between the back plate of the bracket assembly and the separate plate.

18. The locking assembly according to claim 17 wherein there are two set screws and two apertures within the separate plate and back plate and one set screw per aperture used to fasten the separate plate and back plate of the bracket assembly about the plurality of bars.

19. The locking assembly according to claim 1 further comprising a pair of magnets, with one positioned on the upper leg of the pivoting release lever and the other positioned on the back plate, in order to further restrain pivoting movement of the pivoting release lever when the interlocking notches are interlocked.

20. The locking assembly according to claim 1 wherein the pivoting release lever further consists of a barrel inserted within the upper leg of the pivoting release lever having an end plate at the base of the barrel of a size and shape to conform with a key having a similar conforming end to that of the base; and wherein the barrel further includes a flange that is moveable from side-to-side when the key is inserted into the barrel in order to engage a catch mounted within an interior side of one of the plates of the bracket assembly such that when the flange is restrained against the catch and the bracket assembly, the pivoting release lever is restrained from movement until the flange is moved away from engaging the catch.

21. A locking assembly for readily attaching and dislodging a device to and from a surface, the locking assembly comprising:

a bracket assembly having a front plate and a back plate spaced apart and fixedly attached to each other about portions of peripheries of the front and back plates to form an opening therebetween having a top slot and an adjacent slide slot;

a yoke assembly having a yoke assembly plate with an upper portion and a bottom edge; said yoke assembly plate being of a size and shape to be received and guided into the top slot between the front and back plates via the bottom edge of the yoke assembly plate, said yoke assembly further including a yoke in which a portion of the yoke extends from and is fixedly connected to the yoke assembly plate and another portion of the yoke is fixedly attached to the device;

at least one pivoting release lever positioned within the side slot between the front and back plates of the bracket assembly, said pivoting release lever having an upper leg and a lower leg interconnected by a pivot that is attached to the front and back plates of the bracket assembly such that the pivoting release lever can freely pivot within the opening between the front and back plates about the pivot within a defined boundary between a locked and dislodged position; said pivoting release lever further having an outer surface that can be engaged to cause pivoting movement of the pivoting release lever;

restraint means to restrain pivoting movement of the corresponding pivoting release lever relative to the yoke assembly plate when the yoke assembly plate is substantially inserted within the opening between the front and back plates of the bracket assembly via the top slot;

wherein an upper surface of the lower leg is positioned within the opening below the bottom edge of the yoke assembly plate; and securement means to secure at least the back plate of the bracket assembly to the surface.

22. The locking assembly according to claim 21 wherein the restraint means includes a pair of interlocking notches positioned on an upper portion of the yoke assembly plate to interlock and restrain pivoting movement of the corresponding pivoting release lever relative to the yoke assembly plate when the yoke assembly plate is substantially inserted within the opening between the front and back plates of the bracket assembly via the top slot.

23. The locking assembly according to claim 22 wherein the restraint means further includes a pair of magnets, with one magnet positioned on an exterior surface of the upper leg of the pivoting release lever and the other magnet is positioned on the back plate.

24. The locking assembly according to claim 22 wherein the restraint means further includes an elongated bar that is fixedly attached to at least the front or the back plate and positioned therebetween to act as an abutment to restrain certain pivoting movements of the pivoting release lever within the side slot.

25. The locking assembly according to claim 21 wherein the securement means is at least one set screw and a corresponding aperture within the back plate of the bracket assembly of a size and shape to receive a threaded portion of the set screw.

26. The locking assembly according to claim 25 wherein there are two set screws used to fasten the back plate of the bracket assembly to the surface.

27. A locking assembly for readily attaching and dislodging a device to and from a surface, the combination of the locking assembly and device comprising:

a bracket assembly having a front plate and a back plate spaced apart and fixedly attached to each other about portions of peripheries of the front and back plates to form an opening therebetween having a top slot and at least one adjacent slide slot;

a yoke assembly having a yoke assembly plate with an upper portion and a bottom edge; said yoke assembly plate being of a size and shape to be received and guided into the top slot between the front and back plates via the bottom edge of the yoke assembly plate, said yoke assembly further including a yoke in which a portion of the yoke extends from and is fixedly connected to the yoke assembly plate, and another portion of the yoke is fixedly attached to the device;

at least one pivoting release lever positioned within the side slot between the front and back plates of the bracket assembly, said pivoting release lever having an upper leg and a lower leg interconnected by a pivot that is attached to the front and back plates of the bracket assembly such that the pivoting release lever can freely pivot within the opening between the front and back plates about the pivot within a defined boundary between a locked and dislodged position; said pivoting release lever further having an outer surface that can be engaged by an external force in order to cause pivoting movement of the pivoting release lever;

a pair of interlocking notches corresponding with each pivoting release lever with one portion of the pair of interlocking notches positioned on the upper leg of the corresponding pivoting release lever and the other portion of the pair of interlocking notches positioned on an upper portion of the yoke assembly plate to interlock and restrain pivoting movement of the corresponding pivoting release lever relative to the yoke assembly plate when the yoke assembly plate is substantially inserted within the opening between the front and back plates of the bracket assembly via the top slot;

wherein an upper surface of the lower leg is positioned within the opening to be below the bottom edge of the yoke assembly plate; and at least one fastener to secure at least the back plate of the bracket assembly to the surface.

28. The locking assembly according to claim 27 wherein the device is a dog dish.

29. The locking assembly according to claim 27 wherein the device is a shelf.

30. The locking assembly according to claim 27 wherein the device is a rod holder.

31. The locking assembly according to claim 27 wherein the device is a collar.

32. The locking assembly according to claim 27 wherein the device is a framed piece of art and the back of the frame is directly attached to the yoke assembly plate.

33. The locking assembly according to claim 27 wherein the device is a flashlight.

* * * * *

UNITED STATES PATENT AND TRADEMARK OFFICE
CERTIFICATE OF CORRECTION

PATENT NO. : 7,261,264 B2  Page 1 of 1
APPLICATION NO. : 11/173562
DATED : August 28, 2007
INVENTOR(S) : Eric M. Moran It is certified that error appears in the above-identified patent and that said Letters Patent is hereby corrected as shown below:

Best Mode for Carrying Out the Invention:

Col. 9, line 55: Please replace "attached" with -- attach --

In the Claims:

Claim 1, Col. 10, line 40: Please replace "slide" with -- side --
Claim 21, Col. 12, line 39: Please replace "slide" with -- side --
Claim 27, Col. 13, line 40: Please replace "slide" with -- side --

Signed and Sealed this

Eleventh Day of March, 2008

JON W. DUDAS
*Director of the United States Patent and Trademark Office*